June 27, 1950  R. W. JENSEN  2,512,800
COOLER AND VALVE THEREFOR
Filed July 17, 1945  2 Sheets-Sheet 1
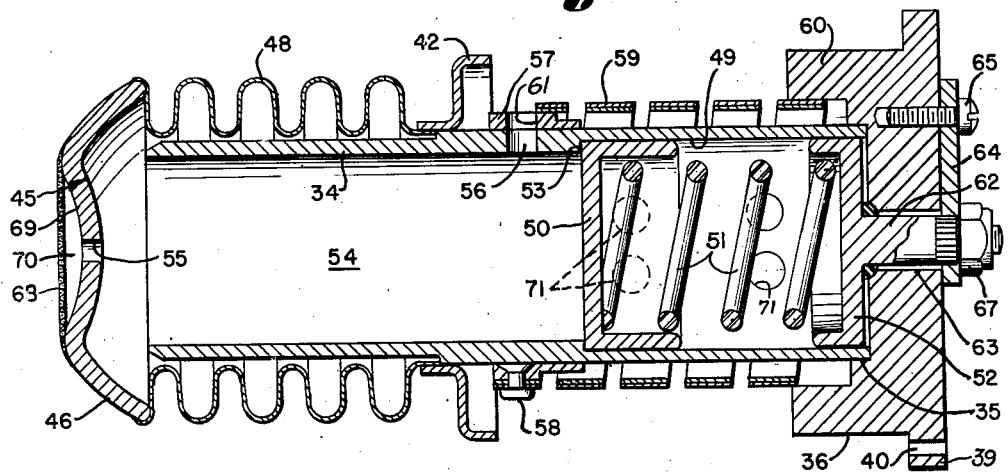
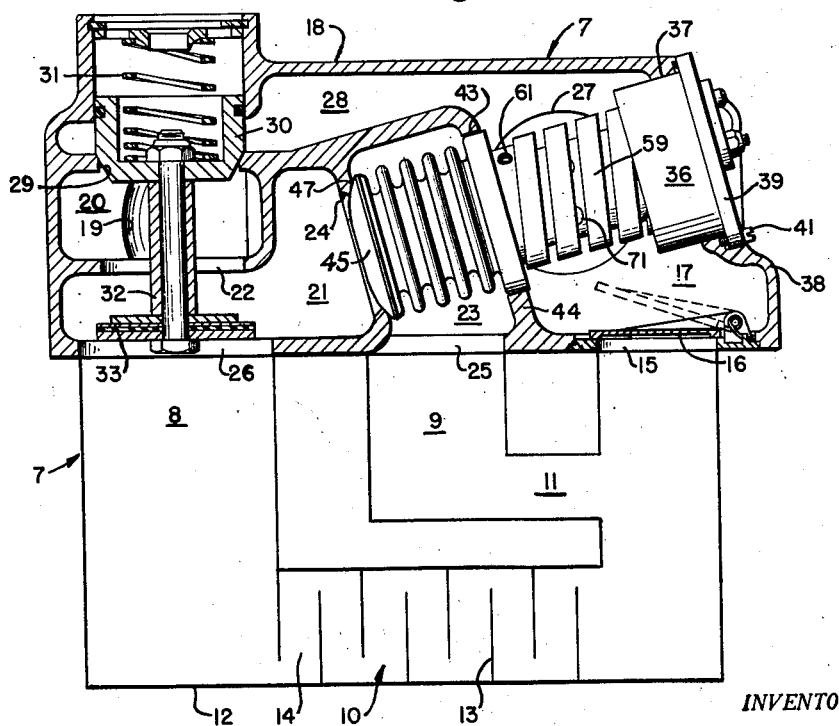
INVENTOR.
RAYMOND W. JENSEN
BY
ATTORNEY June 27, 1950  R. W. JENSEN  2,512,800
COOLER AND VALVE THEREFOR
Filed July 17, 1945  2 Sheets-Sheet 2

INVENTOR.
RAYMOND W. JENSEN
BY
ATTORNEY

UNITED STATES PATENT OFFICE 2,512,800

COOLER AND VALVE THEREFOR

Raymond W. Jensen, Los Angeles, Calif., assignor to The Garrett Corporation, Airesearch Manufacturing Company division, Los Angeles, Calif., a corporation of California Application July 17, 1945, Serial No. 605,490

11 Claims. (Cl. 257—2)

This invention relates to the control of the flow of a liquid through a cooler having heat exchange means for cooling the liquid and having a warm up bypass for bypassing the heated liquid in such a manner as to relieve excess pressure and to warm up the heat exchange means when congealment occurs therein. An object of the invention is to provide an improved temperature and pressure responsive valve unit for controlling the flow of the liquid through the heat exchange means and the bypass in accordance with changes in temperature and pressure conditions.

The invention is particularly useful in the control of the flow of lubricating oil through an oil cooler employed in regulating the temperature and viscosity of lubricating oil for aircraft engines. A primary function of such a cooler is to remove excess heat from the oil as it comes in a heated condition from the engine and to return the oil to the engine in a proper condition of fluidity and viscosity. An aircraft oil cooler must be capable of faithfully carrying out this function when the temperature of the atmosphere is high (placing a high cooling load on the cooler) and when the temperature of the atmosphere is extremely low (giving rise to the problem of congealment of the oil against the walls of the heat exchange passages of the cooler). It must be capable of handling not only mild variations in temperature, but also such extremes of temperature change. In general, there have been two lines of development of apparatus for handling these problems. One method of attack is to utilize thermostatic control of the flow of a coolant (usually air) through the cooler so as to reduce the cooling effect when atmospheric temperature drops. But it is also highly desirable to utilize thermostatic control of the oil circulation through the cooler in connection with suitable means for bypassing a portion or all of the oil around the cooler core when oil viscosity becomes too great, in order to relieve the core of the excessive pressures which are developed as a result of excessive viscosity, and at the same time to reduce the cooling effect and to permit the temperature of the oil to rise.

But even further measures are usually considered highly desirable if not essential to the proper control of oil temperature under widely varying conditions. It is possible for the temperature to drop so rapidly as to reach such a low stage that the thickening of the oil is not arrested even where all of the oil is bypassed through a warm up jacket, and it may become necessary to bypass at least some of the oil directly from the cooler inlet through the cooler outlet or externally of the cooler so as to relieve the warm up jacket as well as the cooler core. Necessity for such short bypassing may also arise from sudden surges at the cooler inlet. In connection with such bypassing, it is desirable to isolate the core from the high inlet pressure. The present invention contemplates a control mechanism adapted to handle all of these problems and yet of simple and compact construction and arrangement. A particular object of the invention is to provide a temperature and pressure responsive valve unit which is particularly adapted for operation as a part of such a control mechanism, for example—a mechanism embodied in a control head having a main inlet and a main outlet, a chamber which serves both as an outlet chamber and a direct bypass chamber, a warm up bypass jacket, a thermo-pressure responsive valve unit for controlling the flow through a warm up bypass chamber and thus controlling the flow through the warm up jacket, and an inlet chamber together with surge valve mechanism adapted, under excessive pressures and pressure surges, to isolate such inlet chamber from its normal connection with the core inlet and to open up a normally closed connection to the direct bypass chamber. More specifically, it is an object of the invention to provide a thermo-pressure responsive valve unit particularly adapted for operation in a control mechanism, which, in addition to the above indicated features, causes the streams of oil from the warm up bypass and heat exchange core to converge and mix before impinging upon the thermostatic element of the valve unit. A further object is to provide an improved thermo-pressure responsive valve unit particularly adapted for operation in a control mechanism wherein such valve unit is responsive to temperature at the cooler outlet but operates to control flow at the inlet region of the cooler.

A further object of the invention is to provide such a thermo-pressure responsive valve unit which is adapted to utilize the fluid pressure in the chamber controlled by the valve unit, applied to the rear side of the valve, for closing the valve against the same pressure tending to open it, and which incorporates thermo-responsive means for relieving such fluid pressure from the rear side of the valve element when temperature conditions call for opening of the valve, in order that the fluid pressure acting against the face of the valve may overcome the spring pressure and open the valve. In connection with the provision of such a fluid pressure operated valve unit, the invention includes the following objects:

(1) To provide an improved and simplified construction for defining a fluid pressure chamber between the valve head and a hollow valve body on which the valve element is carried, and for supporting the valve element relative to said hollow body, in such a manner that the valve element may move with the utmost freedom from frictional resistance;

(2) To provide for maximum sensitivity of the valve head to the factors by which it is controlled;

(3) To incorporate in a single element the function of connecting the valve head to the hollow body so as to provide a fluid pressure chamber and to permit the valve head to move in response to changes in the differential between the pressure in said chamber and the pressure acting against the face of the valve and also the function of supporting the valve head in closed relation to its cooperating valve port in the absence of fluid pressure acting against the head;

(4) To provide for yielding of the valve head under pressure surges;

(5) To incorporate a thermostatic element of maximum sensitivity to temperature change;

(6) To provide for relief, through the valve unit, of sustained excess pressures;

(7) To provide for adjustment of the setting of the thermo-responsive portion of the valve unit; and (8) To provide all of these characteristics in a simple valve unit adapted to cooperate in a control mechanism such as that outlined above.

The relief of sustained excess pressures through the thermo-pressure responsive valve unit itself may be accomplished in either of two ways—as disclosed in my prior application, Serial No. 521,510, filed February 8, 1944 for Protected Cooler, now abandoned. The main valve element may be mounted so as to yield with reference to the fluid pressure chamber against the yielding resistance of a spring. Alternatively, a separate pressure relief valve may be incorporated in the valve unit. The present invention embodies, in its preferred form, the employment of a separate pressure relief valve within the valve unit and the within disclosure includes, by reference, the disclosure with reference to the separate pressure relief valve type of thermo-pressure responsive valve unit disclosed in my aforesaid prior application of which the present application constitutes a continuation-in-part. The present invention, however, contemplates, in addition, the combining of both the separate pressure relief valve (for relieving sustained excessive pressures) and the yielding connection between the main valve element and the fluid pressure chamber (for surge relief through the warm up bypass) in the same valve unit.

Further objects and advantages of the invention will be brought out in the following part of the specification.

Referring to the drawings which are for illustrative purposes only:

Fig. 1 is a longitudinal sectional view through a control mechanism embodying the invention, with a schematic showing of an oil cooler to which the control mechanism is applied;

Fig. 2 is a longitudinal detail sectional view through the thermo-pressure responsive valve unit in its preferred form;

Figure 4:
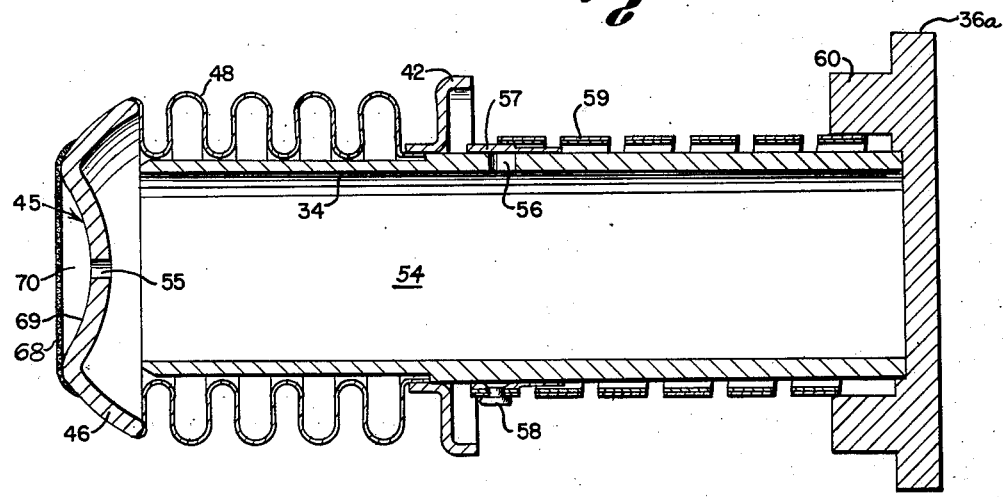
Fig. 4 is a longitudinal sectional view of another modified form of the valve unit.

As an example of one form in which the invention may be embodied, I have shown in Fig. 1 an oil cooler control mechanism which is designated generally by the reference numeral 7. The cooler body 7 may be of construction generally conforming to that shown in the application of Walter R. Ramsaur, Serial No. 568,018, filed December 13, 1944, for Oil Cooler, now Patent No. 2,474,689, dated June 28, 1949, wherein the warm up bypass is abbreviated to cover a relatively small portion of the cooler shell. My improved control mechanism is preferably utilized in connection with a cooler, wherein the thermo-pressure responsive valve unit is responsive to changes in temperature at the cooler outlet, but controls flows at the cooler inlet. Accordingly, the cooler body 7 incorporates separate inlets 8 and 9 respectively to the core and warm up passages 10 and 11 respectively. The cooler core embodies a shell (customarily cylindrical or elliptical) indicated at 12, a plurality of bundles of tubes (not shown) through which a coolant such as air may be passed, and a plurality of interspaces between the tubes for the flow of the oil to be cooled, such interspaces being divided by alternately disposed baffles 13 into a plurality of chambers collectively defining a tortuous passageway 14 for the flow of oil through the core. The core 10 and warm up bypass 11 have a common outlet 15 from which the oil may pass a core check valve 16 into an outlet chamber 17 in the control housing 18.

The control housing 18 provides an inlet 19, an inlet chamber 20, an inlet junction chamber 21, a port 22 connecting the chambers 20 and 21, a valve chamber 23, a control port 24 connecting the junction chamber 21 to the valve chamber 23, a port 25 connecting the valve chamber 23 to the warm up bypass 11, a port 26 connecting the junction chamber 21 to the core inlet 8, a main outlet 27 leading from the outlet chamber 17, and a direct bypass 28 from a port 29 in the inlet chamber 20 to the main outlet 27.

The direct bypass 28 functions to provide a direct path from the inlet 19 to the outlet 27 when inlet pressure becomes so great as to be injurious both to the core and the warm up bypass 11. Normally, however, such direct bypass is closed off by a pressure relief valve 30 which is urged against a valve seat in the port 29 by a compression spring 31. The relief valve 30 carries, on the end of a stem 32, a core and warm up bypass protection valve 33 which is adapted to cooperate with the port 22 in closing off the inlet chamber 20 from communication with the core and warm up bypass when the relief valve 30 opens. The pressure relief valve 30 ordinarily functions to relieve surges of excess pressure in the inlet 19, and is therefore commonly referred to as a surge valve. In the present invention, it functions to relieve the higher excess pressures, while excess pressures and surges of a lower magnitude are relieved through the thermo-pressure responsive valve unit, which will be now described.

My improved thermo-pressure responsive valve unit, in the form shown in detail in Fig. 2, comprises a tubular body 34, one end of which is rotatably mounted in a counterbore 35 in a cap 36 which in turn is mounted in a bore 37 in an end wall 38 of the housing 18. The cap 36 has a flange 39 having holes 40, through which cap screws 41 are threaded into the casing wall 38 to secure the valve unit in place.

A collar 42, secured to an intermediate region of the tubular body 34, is snugly seated in an opening 43 in a wall 44 of the housing 18 and cooperates with the wall 44 to separate the valve chamber 23 from the outlet chamber 17. Thus, a portion of the valve unit is disposed within the valve chamber 23 and another portion of the valve unit is disposed within the outlet chamber 17.

That portion of the valve unit which is disposed within the valve chamber 23 includes the main valve head element 45 which has a valve face 46 formed as a portion of a spherical surface and adapted to cooperate with a valve seat 47 adjacent the port 24. The spherical shape of the valve face 46 makes it possible for it to conform to the seat 47 irrespective of any slight angular displacement of the valve element 45 which may occur. This is important in view of the specific means provided by the present invention for mounting the valve element 45 with reference to the body 34.

The valve head 45 is preferably of molded plastic material adapted to maintain a high polish on the valve face 46, relatively unaffected by wear, and to thereby provide substantially permanently for a good seating contact with the valve seat 47.

The valve head 45 is attached to one end of a bellows sleeve 48 of thin, annularly corrugated, metal the other end of which is attached to the tubular body 34. The body 34 extends through the sleeve 48 and prevents the free end of the sleeve from sagging. A small amount of clearance is provided between the inner extremities of the convolutions of the sleeve and the outer surface of the body 34 in order that the sleeve may freely expand and contract in an axial direction. Slidably mounted in a counterbore 49 in the body 34 is a pressure relief valve element 50. A compression spring 51 is engaged under compression between the valve element 50 and an end member 52 on which the body 34 is secured. The spring 51 normally maintains the valve element 50 engaged against a shoulder 53 in the body 34.

Defined between the valve element 45, the valve element 50 and the body 34 and sleeve 48 is a fluid pressure chamber 54, into which fluid may enter from the junction chamber 21 through a restricted aperture 55 in the main valve head 45. Reacting against the walls of the body member 34 and sleeve 48 and against the relief valve element 50, the pressure of this fluid will be applied to the entire area of the inner face of the valve head 45. The effective area of the bellows is equal to the area of the valve port 24 so that the effective fluid pressure within the bellows and the thrust provided by the relatively light spring pressure of the sleeve 48 will hold the valve head on its seat against the opening force of fluid or oil in the junction chamber 21. Thus, the valve is normally maintained in its closed position when oil is not being pumped through the cooler. It is to be understood, of course, that an effective area of the bellows may be larger than that of the port 24. In other words, the area of the port 24 may be equal to or less than the effective area of the bellows, depending on which arrangement is required for a particular installation.

The pressure in the chamber 54 may be relieved through an escape port 56 in the wall of the valve body 34, the port 56 being disposed rearwardly of the collar 42 so as to communicate with the outlet chamber 17. The port 56 is of materially larger area than the restricted bleed port 55 so that oil may escape from the chamber 54 more freely than it is permitted to enter the chamber. The escape port 56 is normally closed by a pilot valve sleeve 57 snugly encircling and rotatable upon the outer surface of the valve body 34. The sleeve 57 is attached, as by a rivet 58, to one end of a bi-metallic coil 59, the other end of which is anchored within a flange 60 of the cap 36. The valve sleeve 57 is provided with an escape port 61 (Fig. 2) having a diameter as large as that of the port 56, adapted to register with the port 56 when the thermostatic coil 59 is subjected to temperatures below normally operating temperatures. The opening of the valve port 56 which thus results is a gradual and progressive opening which is reflected in a gradual relaxing of pressure in the chamber 54, a gradual enlargement of the opening between the valve element 45 and the valve seat 47, and a gradual increase in the ratio between the flow through the warm up bypass 11 and the flow through the core 10.

The end member 52 is attached to a stud 62 which extends through an opening 63 in the cap 36, and at its outer end, carries a lever 64, by means of which the valve body 34 may be adjusted circumferentially with relation to the valve sleeve 57, thus varying the range of temperature in which the port 56 is uncovered and covered. A particular advantage of this arrangement lies in the fact that adjustment of temperature response can be effected from the exterior of the cooler. A lock screw 65, extending through an arcuate slot 66 in the lever 64, and threaded into the cap 36, locks the valve body in any position to which it may be adjusted. In order to permit assembly and disassembly of the valve body with reference to the cap 36, the lever 64 is detachably secured upon a splined section of the stud 62 by a lock nut 67.

To prevent the entry into the chamber 54 of foreign matter which could interfere with the operation of the valve unit, the bleed port 55 is protected by a screen 68 attached to the face of the valve head 45. In order that the screen may not restrict the flow through the port 55, the central region of the valve head 45 is dished as at 69 to provide a space 70 between the screen and the port 55.

In the operation of a cooler equipped with my improved control mechanism, under normal conditions the parts will be in the positions shown in Fig. 1. Oil entering the inlet chamber 20 through the inlet 19 will pass into the junction chamber 21 and, the valve head 45 being seated or substantially seated, will flow either entirely or largely through the core 10. Leaving the core 10 through the outlet 15, it will lift the core check valve 13, pass through the outlet chamber 17, washing the bi-metallic coil 59, and will then pass out through the outlet 27. Responding to normal operating temperature of the oil thus passing through the chamber 17, the thermo-responsive coil 59 will maintain the pilot valve 56, 57 closed so as to maintain within the chamber 54 the pressure of the oil in the junction chamber 21, communicated thereto through the bleed port 55. Since this pressure in the chamber 54 acts against the full area of the inner face of the valve element 45, whereas the pressure in the junction chamber 21 acts against the more restricted area of the face of the valve head 45, the pressure in the chamber 54 will overcome the pressure against the face of the valve head, and will maintain the valve in its closed position.

When the temperature of the oil leaving the core drops below a predetermined level, the pilot valve 56, 57 will commence to open, thus partially relieving the pressure in the chamber 54 by leakage through the escape port 56. As the port 56 is progressively uncovered there will be a progressive pressure drop in the chamber 54 from full equalization with high pressure in the junction chamber 21 toward full equalization with low pressure in the outlet chamber 17, the latter equalization being attained when the uncovered area of the port 56 exceeds the area of the bleed port 55. When the total pressure acting against the inner surface of the valve head 45 in closing direction drops below the pressure acting against the face of the valve head in valve opening direction, the valve will commence to open, the extent of opening being determined by a balance between reduced pressure in the chamber 54 and reduced pressure against the face of the valve head, the reduction in this latter pressure resulting from pressure drop through the valve port 24. Thus a varying diversion of flow from the core 10 to the warm up chamber 9 will be effected in proportion to the drop in temperature at the outlet.

Pressure surges of moderate intensity occurring during normal operation (i. e., with the pilot valve 56, 57 closed or substantially closed and the valve head 45 closed under the differential of pressure in the chamber 54 over pressure in the chamber 21 acting against the face of the valve) will be relieved through the warm up bypass 11 by yielding of the head 45 under such excess pressures. Such pressure relief will occur only when the pressure surges are sufficient to increase the pressure against the face of the head 45 over the pressure acting against its inner surface. In order that moderate pressure surges may be thus relieved, the invention contemplates providing only a relatively small differential in the pressure acting against the inner side of the valve over the pressure acting against the face, and thus the difference in the inner and outer areas of the valve element, against which the oil pressure acts, will be relatively small. Such pressure relief will occur only in response to surges or sudden increases in pressure in the chamber 21 as contrasted to slow increases in pressure, since a slow increase would permit the increased pressure to be reflected in the chamber 54 through the bleed port 55, whereas the resistance to flow offered by the restricted port 55 will prevent any substantial build up of pressure in the chamber 54 in response to momentary surges of increased pressure in the chamber 21.

Gradual rise of pressure in the chamber 21 to excessive levels, reflected in a corresponding rise in pressure in the chamber 54 will ultimately, at an excessive pressure level, cause the spring 51 to yield under the increased pressure thus applied to the pressure relief valve 50, resulting in movement of the latter to uncover a plurality of pressure relief ports 71 in the valve body 34, through which such excess pressure will be relieved.

The pressure surges which are relieved by yielding of the valve 45 are moderate surges, tending to be injurious to the core but not sufficiently excessive to injure the warm up bypass 11 through which such surges are relieved. The sustained pressures that are relieved through the ports 71 may be be the same or of higher intensity, and are relieved directly through the valve to the outlet chamber 17, thus bypassing both the core and the warm up passage 11.

Where pressure surges of unusually heavy intensity occur or whenever the pressure in the chamber 21 tends to build up to an excessive level to such a degree or at such a rate that the port 71 cannot adequately relieve the excess, relief will be afforded through the relief port 29 by the lifting of the surge valve 30 and thereupon the core and bypass 11 will be protected by the closing of the protective valve 33. Such heavy pressure surges or extra excessive pressures will usually occur in connection with congealment of the core or when an airplane is started after a period of inactivity in which the oil throughout the cooler has become quite cold and viscous. Under such conditions, the back pressure in the core and even in the warm up passage may rise to excessive high levels, sufficient to lift the surge valve 30.

Figure 3:
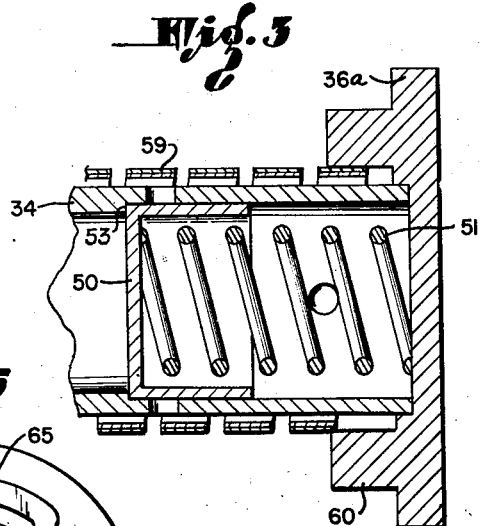
Fig. 3 is a partial longitudinal sectional view of a modified form of the valve unit.
Figure 5:
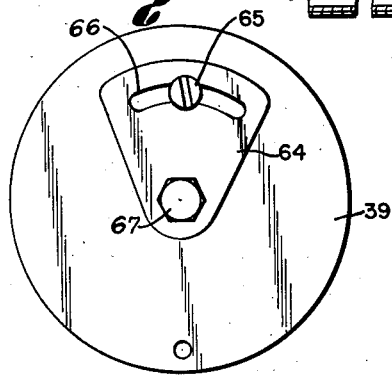
Fig. 5 is an end view of the valve unit shown in Fig. 2.

In the form of the invention shown in Fig. 3, the construction is the same as that shown in Fig. 2 with the exception that the means for adjusting the pilot valve is omitted and the valve body 34 is secured directly in the cap 36a. Other parts are identified by the same reference numerals as those used to designate similar parts in Fig. 2.

In the form of the invention shown in Fig. 4, the construction is the same as that shown in Fig. 2, and is indicated by the use of similar reference numerals to designate similar parts, with the exception of the omission of the means for adjusting the pilot valve and the omission of the pressure relief valve within the valve body. In this form of the invention, pressure relief through the thermo-pressure responsive valve unit is effected by yielding of the main valve element 45.

Utilization of the main valve element 45 as the relief valve as well as the thermo-responsive valve, is accomplished by correlating the areas of main valve opening and effective bellows area, and the spring action of the bellows so that the main valve opening has a larger area than the effective bellows area, giving the valve a tendency to open irrespective of the pressure against the main valve face. The calibration of the spring action of the bellows is such as to overcome this opening tendency of the main valve up to the relief pressure limit.

For example, if the area of the main valve opening is 1.5 square inches, and the effective area of the bellows is 1.45 square inches, and it is desired to have the valve relieve excess pressure beyond 40 p. s. i., the difference of .05 square inch between 1.5 and 1.45 square inches is divided into 40 p. s. i., giving a spring pressure of 2 pounds at which the bellows spring is calibrated. Consequently, the bellows is designed to give a 2-pound spring thrust in the closed position.

I claim as my invention:

1. A thermo-pressure responsive valve unit comprising a valve head adapted to cooperate with a port wherein fluid pressure is applied to the valve head in valve opening direction, a tubular valve body, closed at one end and open at its other end, a bellows sleeve attached at one end to said tubular body and at its other end to said valve head for supporting the latter in yieldable relation to said open end of the body, said valve head having an aperture and cooperating with said body and sleeve to define a chamber wherein the pressure of the fluid at said port, bleeding through said aperture, may be applied to the rear surface of said valve head for closing the same, said valve body having a fluid escape port, a pilot valve element cooperating with said escape port, a thermo-responsive means for moving said pilot valve element between a position wherein said escape port is closed to permit the pressure to build up in said chamber and a position wherein the escape port is open to relieve the pressure in said chamber and permit said valve head to yield under the pressure of the fluid in said first mentioned port, said valve body having a pressure relief port therein, and a spring urged pressure relief valve element normally closing said relief port but adapted under excess pressures within said chamber to uncover said relief port so as to limit the increase in such excess pressure and permit the valve head to yield under any further increase in pressure in said first mentioned port.

2. A valve unit including a valve head adapted to cooperate with a flow control port, wherein fluid pressure is applied to said head in valve opening direction, a tubular valve body having a closed end and an open end, means connecting said head to said open end of the valve body for yielding movement relative thereto and cooperating with said head and valve body to define a fluid pressure chamber, said valve head having an aperture through which fluid may pass from said flow control port into said chamber to apply valve closing pressure to said valve head, said valve body having a fluid escape port and a pressure relief port, a pilot valve element cooperating with said escape port, thermo-responsive means for moving said pilot valve element between a position wherein said escape port is closed to permit the pressure to build up in said chamber to a position wherein the escape port is uncovered to relieve the pressure in said chamber and permit said valve head to yield under the pressure in said flow control port, said valve body having in its closed end portion a counterbore terminating at a shoulder within said valve body, a cup shaped pressure relief valve element having a peripheral flange adapted to cover said pressure relief port and a face adapted to engage said shoulder, a coil spring engaged between the closed end of said valve body and said pressure relief valve element and yieldingly urging the same against said shoulder, said spring being adapted to yield under excess pressure in said chamber to permit said pressure relief valve element to move to a position uncovering said pressure relief port.

3. A valve unit including a valve head adapted to cooperate with a flow control port in which fluid pressure is applied to said valve head in valve opening direction, a tubular valve body having a closed end and an open end, means connecting said valve head to said valve body over said open end thereof and adapted to yieldingly permit movement of said head relative to said body and cooperating with said head and body to define a fluid pressure chamber, said valve head having an aperture through which fluid may enter said chamber from said flow control port to apply pressure to said valve head in valve closing direction, said valve body having a fluid escape port, an arcuate valve element rotatably associated with the outer surface of said valve body and cooperating with said escape port, a cap for mounting said unit in a control housing, the closed end of said valve body being rotatably mounted on said cap, a helical thermostatic coil, one end of which is attached to said arcuate valve element and the other end of which is attached to said cap, and means acting between said cap and said valve body to rotatably adjust said valve body with reference to said cap, whereby to adjust the position of said arcuate valve element relative to said escape port for any given temperature responsive condition of said thermostatic coil.

4. A valve unit as defined in claim 3, wherein said last means comprises a stub shaft on the end of said valve body, projecting through a bore in said cap, a lever attached to the outer end of said stub shaft, and means for connecting said lever to the outer face of said cap in any one of a series of circumferentially adjusted positions.

5. A thermo-pressure responsive valve unit, comprising: a valve head adapted to cooperate with a port wherein fluid pressure is applied to the valve head in valve opening direction; a tubular body closed at one end and open at the other end; a bellows sleeve attached adjacent one end of the tubular body and at its other end to said valve head for supporting the latter in yieldable relation to the open end of said body, said valve head having an aperture and cooperating with said body and sleeve to define a pressure chamber, said valve body having a pair of pressure relief ports; a valve element controlling one of said pressure relief ports; thermo-responsive means for controlling the last named valve; and a pressure responsive valve controlling the other of said pressure relief ports.

6. Control mechanism for an oil cooler having a heat transfer core, a bypass including a valve port and a wall with an opening aligned with said port, comprising: a tubular valve body having a closed end and an open end; a bellows sleeve received on a portion of the tubular body adjacent the open end and having one end secured to said body, the opposite end of said sleeve extending beyond said open end, said sleeve being supported by said tubular body; a valve head, having a port therein, secured to the free end of the bellows sleeve; a flange-like collar secured to the tubular body adjacent the fixed end of the bellows sleeve for closing the opening in said wall, said tubular body having a pressure relief port; a valve for controlling said relief port; and temperature responsive means controlling the last named valve.

7. The invention defined by claim 6, wherein the tubular body has a second relief port and there is a pressure responsive valve controlling said port.

8. A valve unit, comprising: a tubular body closed at one end and open at its other end; a bellows sleeve having one end attached to said tubular body; an apertured valve head secured to the other end of the bellows sleeve, and cooperating with the body and sleeve to define a chamber wherein the pressure of the fluid at said aperture may be applied to the rear surface of the valve head, said valve head being supported by the sleeve in yieldable relation to the open end of the body, said body having a fluid escape port; a pilot valve element cooperating with the escape port; thermo-responsive means for moving said pilot valve element between a position wherein said escape port is closed to permit a pressure build-up in the chamber and a position wherein the escape port is open to relieve pressure in said chamber and permit the valve head to yield under pressure of fluid against the face thereof, said valve body also having a pressure relief port therein; and a spring urged pressure relief valve element normally closing said relief port but adapted under excess pressures within the chamber to uncover said relief port so as to limit the increase in said excess pressure and permit the valve head to yield under any further increase in pressure against the face thereof.

9. In a valve unit: a tubular valve body having a closed end; a bellows sleeve received on a portion of the tubular body adjacent the open end and having one end secured to said body, said sleeve being supported by said tubular body; a valve head having a port therein, secured to the free end of the bellows sleeve adjacent the open end of the tubular valve body, said valve head being so supported by the bellows sleeve as to be movable toward and away from the adjacent end of said valve body; a flange-like collar on the tubular body intermediate its ends, said tubular body having a pressure relief port; a valve for controlling said relief port and temperature responsive means for controlling the last named valve.

10. The invention defined by claim 9, wherein said valve body includes a second relief port and there is a pressure responsive valve member controlling said second relief port and yielding in the opening direction when the pressure within the valve body rises above a predetermined value.

11. Control mechanism for an oil cooler having a heat transfer core, a bypass including a valve port and a wall with an opening aligned with said port, comprising: a tubular valve body having a closed end and an open end; a bellows sleeve received on a portion of the tubular body adjacent the open end and having one end secured to said body, the opposite end of said sleeve extending beyond said open end, said sleeve being supported by said tubular body; a valve head, having a port therein, secured to the free end of the bellows sleeve; a flange-like collar secured to the tubular body adjacent the fixed end of the bellows sleeve for closing the opening in said wall, said tubular body having a pressure relief port; a valve for controlling said relief port; and pressure responsive means controlling the last named valve.

RAYMOND W. JENSEN.

REFERENCES CITED

The following references are of record in the file of this patent:

UNITED STATES PATENTS

| Number | Name | Date |
|---|---|---|
| 1,595,963 | Eggleston | Aug. 10, 1926 |
| 1,925,301 | Campbell | Sept. 5, 1933 |
| 2,200,318 | Yonkers | May 14, 1940 |
| 2,312,251 | Johnson | Feb. 23, 1943 |
| 2,389,437 | Kmiecik | Nov. 20, 1945 |
| 2,400,911 | Booth | May 28, 1946 |
| 2,425,000 | Paget | Aug. 5, 1947 |

FOREIGN PATENTS

| Number | Country | Date |
|---|---|---|
| 517,012 | Great Britain | Jan. 17, 1940 |